Patented Nov. 7, 1944

2,362,405

UNITED STATES PATENT OFFICE 2,362,405

METHOD OF PRODUCING DEGRADATION PRODUCTS OF CERTAIN STEROID COMPOUNDS

Jacob Rosin, New York, N. Y.

No Drawing. Application April 18, 1944,
Serial No. 531,652

10 Claims. (Cl. 260—397.3)

My invention relates to chromic steroid compounds, and the method of their production and use in connection with the formation of steroid degradation products. The present application is a continuation in part of my application Serial No. 498,589, filed August 13, 1943.

Steroid degradation products are widely used in the manufacture of synthetic sex hormones and other organic compounds, having a great many pharmacological applications. The presently known methods of producing the synthetic sex hormones, while effective, are relatively uncertain, expensive, complicated and wasteful of raw materials. With my method, I am enabled to produce intermediate compounds, chromic steroids, from which the production of the ultimate degradation products is achieved easily, quickly, positively, at much less expense and with greater yields than heretofore.

The old methods of achieving the sterol degradation products, such as deydroandrosterone, progesterone, pregnenolone, androstendione, and other ketones or acid derivatives, are all based on the splitting off of the side chain of the sterols by means of direct oxidation by an oxidative agent capable of splitting off a carbon-to-carbon bond. These methods involve reacting the sterol-containing compounds with the oxidant in the presence of acetic acid, either as a solvent, or as a part of a mixture of solvents. Hexavalent chromium compounds, as chromium trioxide, or others, are the most commonly used oxidants. This method as disclosed in Carpmael, British Patent No. 449,379, dated June 22, 1936, and in corresponding patents in other countries.

All of these direct oxidation methods are faulty in several respects. The yield is rather small because the degradation products continue to be oxidized in the presence of the raw materials which have not yet entered into the reaction. The oxidant and the sterol-containing materials are not particularly soluble in acetic acid, so that relatively large amounts of acetic acid must be employed. Further, it is difficult to prevent the splitting off of the whole side chain, resulting in the formation of ketones of the $C_{19}$ series, and the more desirable ketones of the $C_{21}$ series can be obtained only as by-products in very small yields. Thus, pregnenolone and progesterone, for instance, as ketones of the $C_{21}$ series are very difficult and expensive to produce. When cholesterol is used as the starting material, almost the entire ketone fraction will consist of the $C_{19}$ series. Of course, when the much more expensive stigmasterol is used as the starting material, the yield in ketones of the $C_{21}$ series will be somewhat better, but still very small, ketones of the $C_{19}$ series still being the main resultant product. Another disadvantage is the necessity for protecting, during the oxidation, both the double bond and the hydroxyl groups. If these are not safeguarded, as by bromination and acetylation respectively, the yields will be even smaller because the A ring of the sterols will be split off at the unprotected 3 position, at which the hydroxyl group is attached. By the old methods, the best procedure for obtaining progesterone, for example, would be by detouring over pregnenolone acetate and then, after hydrolization, to split off the acetyl group; bromination, to protect the double bond; oxidation and debromination, to transform same into progesterone. Other disadvantages in the methods are the problems presented in the removal of the solvent and the identification and isolation of the degradation products.

With my method, I either overcome or avoid all of these disadvantages by departing entirely from the old theories. Broadly speaking, I bring the sterol-containing products into reaction with chromium oxychloride under conditions by which the chromium oxychloride does not act as an oxidative agent to split off the side chain, but as a material to form, with the sterols, a new series of metalorganic compounds—chromium oxychloride sterols—in which chromium is still hexavalent. Chromium oxychloride steroids have never before been produced and isolated. From the metalorganic compounds formed by my method, I can produce the ultimate degradation products simply and easily.

The main object of my invention, therefore, is the provision of a method of treating raw sterols-containing material as to produce sterols degradation products with intact cyclopentano polyhydro phenathrene nucleus.

Associated with this object, as another object of my invention, is the production and isolation of intermediary products from sterol compounds, which may thereafter be treated to yield sterol degradation products.

Another object of my invention is the provision of a method of producing and isolating intermediary steroid compounds.

Another object of my invention is the production of chromium oxychloride-steroids in isolatable form.

Another object of my invention is the provision of a method of producing and isolating chromium oxychloride-steroids.

Still another object of my invention is the provision of a method of precipitating chromium oxychloride-steroids from sterol compounds in isolatable form.

Still another object of my invention is the provision of a method of precipitating chromium oxychloride-steroids by reaction of sterol compounds with chromium oxychloride.

Still another object of my invention is the provision of a method of treating intermediary steroid compounds to yield ultimate sterol degradation products.

Still another object of my invention is the provision of a method of decomposing chromium oxychloride-steroids to produce steroid degradation products.

Still another object of my invention is the provision of a method of decomposing chromium oxychloride-steroids by water, aqueous solutions, or organic acids and other organic compounds capable of effecting the decomposition, to produce steroid degradation products.

Depending on conditions (to be detailed below), one or more molecules of chromium oxychloride are permitted to enter into the sterol molecule, care being taken to prevent the decomposition of the chromium oxychloride sterols during the reaction. Thus, in my process, there is substantially quantitative yield of chromium oxychloride steroids, plus unchanged raw material when the reactions are not completely carried through. Once obtained, however, my metal-organic compounds, the chromium oxychloride steriods, are protected against further reaction since they are very resistant to chromium oxychloride, and the addition of more chromium oxychloride would merely result in a reaction between unchanged sterol containing raw material and the chromium oxychloride, and not between the chromium oxychloride and the already-formed chromium oxychloride sterols. In other words, no oxidative degradation takes place during this reaction, which may occur either by precipitation or by direct combination.

Once I have formed the metalorganic compounds, the chromium oxychloride steriods, I then subject them to decomposition by water, by organic acids, or by other suitable non-oxidative agents. During this subsequent decomposition, the chromium salts are split off and simultaneously the degradation of the side chain is effected. There is present, in this stage of my process, no oxidative agent, and the degradation is effected by the autooxidation of every chromium oxychloride sterol molecule, which contains oxygen within itself. No overoxidation is possible, for every molecule is subjected to degradation only as far or as long as its own oxygen supply lasts, and there is no other or outside oxidative agent to attack the ultimate products and they are thereby protected.

My method, therefore, comprises the non-oxidative formation of chromic steroid compounds and their subsequent autooxidative degradation in the absence of any outside oxidant.

I have, with my method, overcome or obviated all the disadvantages of the old processes. I can now control the nature and extent of the reaction, all the way from the formation of the chromic steroids to the degradation products. Also, I have eliminated or substantially reduced the use of solvents in the interactions between the sterol-containing material and the hexavalent chromium.

Within the above general statement of procedure, I can regulate the extent and nature of the degradation in several ways. (1) By the amount of chromium oxychloride molecules introduced into the sterol molecule to form the chromium oxychloride steroid desired. The amount is determined by the augmentation in weight of the chromium oxychloride sterol obtained as compared to the weight of sterol used. (2) By the manner in which the sterol-containing compound is reacted with the chromium oxychloride. For partial degradation of the side chain, as when ketones of the $C_{21}$ series are to be obtained, the dry steroid compound is subjected to vapors of chromium oxychloride. If stronger degradation is sought, solvents are used as carbon tetrachloride, chloroform, or other solvents which do not react with chromium oxychloride or do not provoke a reaction whereby chromium oxychloride acts as an oxidative agent instead of forming with the sterols the chromium oxychloride sterols. (3) By the different media used in the ultimate decomposition. When water is used, the internal or auto-oxidizing effect is more limited than when organic acids are used, because in water a part of the chromium salts split off still retain their hexavalency, whereas in organic acids only salts of trivalent chromium are split off. (4) By varying the concentration of the decomposing material. Thus, a very violent decomposition, and even an explosion, may be achieved if only a very small amount of water is used.

It is obvious, therefore, that depending on the particular degradation product desired, and the raw material used, the conditions above referred to may be varied, but the rationale of my method remains constant; there is no direct oxidation by an outside oxidative agent. Instead, I form and isolate the chromium oxychloride steroid compounds, wherein chromium maintains intact its hexavalency, after which I decompose the chromium oxychloride sterols without using any outside oxidative agent.

*Example I*

As one example of my process, one thousand (1,000) grams of cholesterol dibromide may be spread in thin layers over the shelves of a cabinet, covering a relatively large surface area. Wide mouthed dishes containing chromium oxychloride are disposed inside the cabinets, on supports spaced over the shelves. The cabinet is then closed and sealed against the atmosphere with paraffin. The cabinet is opened after six hours and the chromium oxychloride sterol formed on the shelves may be poured into ten litres of water. The decomposition starts immediately; the chromium salts go into solution and the steroid degradation compounds and unchanged raw material precipitate out. They are filtered, washed and dried. The precipitate is then treated with three (3) litres of methanol. All the degradation products go into solution, whereas most of the unchanged cholesterol dibromide remains undissolved and is readily separated by filtration. Five hundred and fifty (550) grams of cholesterol dibromide may thus be recovered and can be used for the next batch. The methanol filtrate is evaporated in vacuum to dryness and the residue subjected to the usual debromination and purification procedure. The yield in this example is about one (1) gram of progesterone.

If desired, a further amount of unchanged cholesterol dibromide may be recovered by a second recrystallization of the methanol filtrate residue, so that the percentage of yield may be increased.

*Example II*

As another example of my process, I may take a thousand (1,000) grams of cholesterol dibromide and spread same in thin layers over the shelves of the cabinet, covering a relatively large surface area. Wide-mouthed dishes containing chromium oxychloride are disposed inside the cabinet on supports above the shelves. The cabinet is then closed and sealed against the atmosphere with paraffin, and kept sealed at room temperatures for twenty-four (24) hours. The cabinet may then be opened and the chrome steroid compound removed, as by scraping, from the shelves. The material is dry, powdery and of light brown color and its weight is equal to 200% to 210% of the cholesterol dibromide used. No calorific effect was observed during the formation of this product. The weight of the chromium oxychloride is correspondingly reduced.

As is well known, the formulae of even the most simple organic compounds of chromium oxychloride are open to question and discussion, and it is impossible to establish the exact structure and formulae of the so much complicated metal-organic chromium oxychloride sterols. However, the general formula may be given thusly:

$$R(CrO_2Cl_2)_x$$

with the letter "R" representing the steroid compound in question. Upon examination, this brown material will be found to consist, as in the first example of my process, of chromium oxychloride sterols. It is relatively insoluble in carbon tetrachloride, but can be easily decomposed by water into carbon tetrachloride-soluble sterol compounds and into inorganic chromium compounds.

The chromic steroid compound having thus been isolated, it may thereafter be reduced to yield the ultimate sterol degradation product, progesterone, and others, by decomposing same. For instance, the product achieved in the above example, is poured into ten (10) litres of glacial acetic acid under agitation, as by stirring or otherwise. The product first starts dissolving with brownish color, but shortly after the decomposition starts, the solution turns green and the temperature rises to about 40° to 50° C., and any undissolved portion of the material goes into solution. The solution is permitted to remain quiescent for twenty-four (24) hours to complete the decomposition and the debromination may be carried out with zinc powder directly in the same solution, followed by the usual extraction and purification.

The cholestenone-free ketone fraction, upon extraction with petroleum ether and evaporation of the extract to dryness, yields a product containing 25% to 30% of progesterone which is practically free of any androgenic activity. The yield in progesterone is three (3) grams.

The fraction separated from the progesterone as a petroleum ether-insoluble fraction, has androgenic activity.

*Example III*

Cholesterol acetate dibromide is used as the starting material instead of cholesterol dibromide, and the procedures of Examples I and II are followed and will yield pregnenolone acetate instead of progesterone.

*Example IV*

When it is desired to achieve degradation products as dehydroandrosterone, androstiendione, etc., by splitting off the whole side chain, the formation of chromic oxychloride sterols may be carried out in proper solvents. I dissolve 28.5 grams of cholesterol acetate dibromide in 50 cc. of carbon tetrachloride, chloroform or any similar halogenated hydrocarbon. I thereafter add 10 cc. of chromium oxychloride to the solution and agitate the same under control to prevent overheating. Both the cholesterol acetate dibromide and the chromium oxychloride are very soluble in the halogenated hydrocarbon solvents and a relatively small amount of the solvent will suffice to support the desired reaction. After a while, a brown precipitate will be formed. The solvent may be removed easily as by filtration in a filter press, by distillation, or merely permitted to evaporate. Preferably, of course, it is collected for re-use in further batches. The brown precipitataes will consist of the chromium oxychloride steroids, and the final steps may be practiced as outlined above in Examples I and II.

Within my method, other sterols as sitosterol, stigmasterol and other steroid compounds may be used instead of cholesterol. Also, within my method, other solutions, etc., may be used instead of water, acids or alkalis, to provoke the ultimate degradation decomposition reaction of the chromium oxychloride steroids into degradation products and inorganic chromium compounds.

It is seen, therefore, that my method is far simpler than the old methods, it is easier to practice, and presents no problems in technique. It is cheaper, consumes less time, uses less raw materials and results in increased yields of ultimate degradation products. The process is much more controllable and the specific end product desired is achieved with much greater certainty than heretofore.

Having now described my invention, what I claim and desire to secure by Letters Patent is:

1. The method of producing degradation products of steroid compounds having an aliphatic side chain at the 17-position which comprises forming and isolating chromium oxychloride compounds of such steroids by subjecting such steroids to the action of chromium oxychloride vapors and thereafter decomposing these compounds of such steroids into steroid degradation products and chromium compounds.

2. The method of claim 1, in which the steroids are decomposed by the action of water.

3. The method of claim 1, in which the steroids are decomposed by the action of aqueous solutions.

4. The method of claim 1, in which the steroids are decomposed by the action of acids.

5. The method of claim 1, in which the steroids are decomposed by the action of a non-oxidative organic solvent.

6. The method of producing progesterone which comprises reacting chromium oxychloride vapors with steroids having an aliphatic side chain at the 17-position and methyl groups at the 10- and 13-positions and having a protected double bond in the nucleus and an unprotected free hydroxyl group at the 3-position, to form and isolate chromium oxychloride compounds of such steroids, thereafter decomposing same into steroid degradation products and chromium compounds, and then dehalogenating the degradation products.

7. The method of claim 6, in which the steroids are decomposed by the action of water.

8. The method of claim 6, in which the steroids are decomposed by the action of aqueous solutions.

9. The method of claim 6, in which the steroids are decomposed by the action of acids.

10. The method of claim 6, in which the steroids are decomposed by the action of a non-oxidative organic solvent.

JACOB ROSIN.